March 29, 1949. J. C. ROMINE 2,465,932
MAGNETIC BRAKE FOR REELS
Filed Oct. 11, 1943
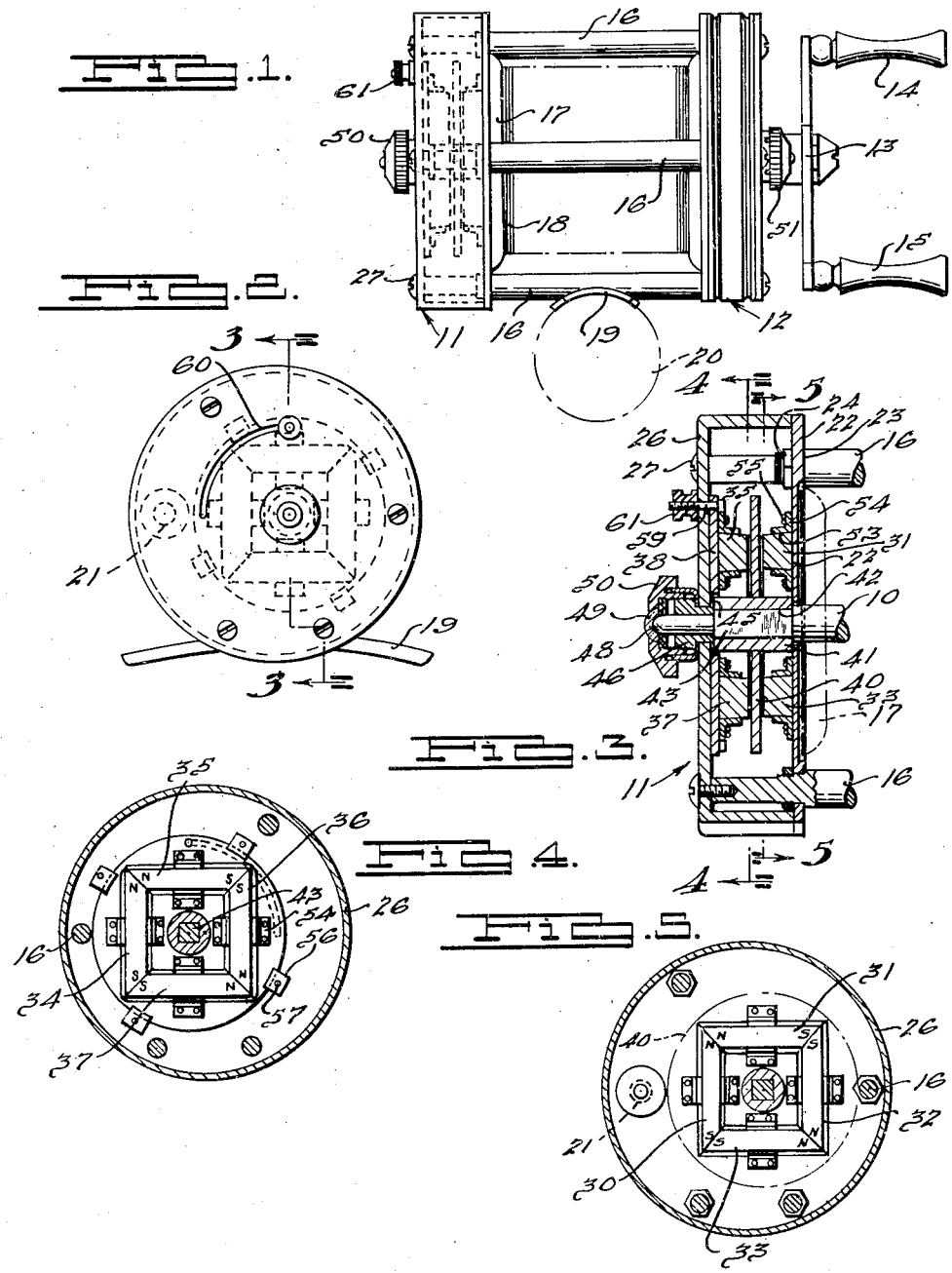
INVENTOR.
Joseph C. Romine.
BY
Harness, Dickey & Pierce.
ATTORNEYS.

Patented Mar. 29, 1949

2,465,932

UNITED STATES PATENT OFFICE 2,465,932

MAGNETIC BRAKE FOR REELS

Joseph C. Romine, Detroit, Mich.

Application October 11, 1943, Serial No. 505,754

2 Claims. (Cl. 188—104)

The invention relates generally to fishing equipment and it has particular relation to a casting or similar reel.

In the use of reels for casting, one of the most serious objections encountered by fishermen is tangling of the line into such condition that it is ordinarily very difficult to untangle it. When this occurs, considerable loose line usually bunches and tangles together to form what is often called a "bird nest" and it is very difficult to straighten out the line and to rewind it on the reel. The tangling of the line may be caused by different factors. For instance, when the bait attached to the end of the line suddenly is stopped in its flight through the air, the pull on the line also stops and the spool, due to its momentum, naturally continues rotating and the loose line collects and tangles at the reel. Usually, fishermen employ thumb pressure on the reel in an attempt to cause the line to pay-out evenly but even with the use of thumb pressure, tangling of the line frequently results due to overrunning of the spool. Even where one is particularly skilled in the use of thumb pressure, this tangling will occur at times and especially if different types of baits are used involving different weights which in turn create different spool momentums.

So-called anti-backlash reels have been designed to prevent this type of line tangling and ordinarily such reels employ a drag or friction device. These devices have not been entirely satisfactory and a major objection is that at lower spool speeds the drag or braking effect is proportionally greater than it is at higher reel speeds, whereas, an opposite condition is preferred. Moreover, the drag or friction device must be adjusted to compensate for variable factors such as weight or baits, weight of line, wind resistance, etc. Furthermore, the brake on the spool creates an undesirable resistance to rewinding by hand. Finally, the previously mentioned thumb pressure is practically required in using such reels in order to control the rotation of the spool and even then, overrunning and tangling will occur from time to time.

Another major disadvantage of reels heretofore employed is that they do not prevent tangling of the line at the reel in the event the bait is snubbed or stopped in flight due to a tangled spool. This tangling can be caused by overrunning or coasting of the spool while the bait is in flight so that the line is supplied faster than the bait can withdraw it or it can be caused by the line becoming caught in or buried in windings on the spool due to too much tension on the line during the previous rewinding. For instance, in the previous rewinding of the line, the latter may temporarily become caught on a weed for instance, or the bait may be relatively heavy, and then during the heavier cranking of the reel excessive tension on the line will cause the burying thereof as mentioned. When the line is thus caught at the reel during casting, the bait suddenly stops in its flight and naturally falls or whips back and as a result considerable loose line may be present between the bait and the reel. With the spool unwinding rather rapidly when this occurs, its momentum will cause it to continue turning in the same direction and it then begins to wind the slack line in the wrong direction. Since the excess line is loose, a bad tangle is created which is made worse by the fact that the tangled line is wound in the wrong direction. The so-called anti-backlash devices either working with or without thumb pressure normally do not prevent this type of tangling and this can be well understood when it is realized that the stopping of the bait occurs so quickly that the momentum of the spool will cause the tangled condition before thumb pressure or the braking device can stop the spool. It might be mentioned, additionally, that such conditions are even worse in the event the line breaks during flight of the bait as in this event the bait cannot assist in retarding excessive tangling.

One object of the present invention is to provide an improved type of casting or similar reel which will avoid the objections previously mentioned and which will make it practically impossible to tangle the line.

Another object of the invention is to provide an improved type of casting reel operable either with or without thumb pressure, depending upon whether or not the user desires to employ such pressure to place or land the bait in a selected spot, without involving any problem of tangling of the line that otherwise might be caused by factors previously mentioned.

Another object of the invention is to provide a casting reel which makes it possible to obtain longer casts with less effort as compared to previous practices while still preventing backlash in the reel.

Another object of the invention is to provide an improved type of casting reel which obtains the advantages previously mentioned while still obtaining a more durable structure and one which has fewer moving parts so that friction and the effects thereof are minimized.

Other objects of the invention will become apparent from the following specification, from the drawings to which it relates and from the claims hereinafter set forth.

For a better understanding of the invention reference may be had to the accompanying drawings wherein:

Figure 1 is a plan view of a casting reel constructed according to one form of the invention.

Figure 2 is an end view of the structure shown by Figure 1.

Figure 3 is a cross-sectional view on a larger scale taken substantially along the line 3—3 of Figure 2.

Figure 4 is a cross-sectional view taken substantially along the line 4—4 of Figure 3.

Figure 5 is a cross-sectional view taken substantially along the line 5—5 of Figure 3.

Referring to Figures 1 and 2, the reel shown includes a shaft 10 which at opposite ends projects into housings 11 and 12 respectively. The housing 12 encloses a gear train of usual character in casting reels and a second shaft projecting from the housing is connected to a crank 13 having handles 14 and 15 provided for turning the reel. Pins 16 located at desired circumferentially spaced positions fasten the two housings together so as to provide a supporting structure. Collars 17 on the shaft adjacent the housings in conjunction with the shaft 10 provide a spool and the fishing line 18 wound on the spool passes outwardly between two of the pins 16. A curved plate 19 is secured to certain of the pins 16 so that the reel may be fastened to a fishing rod indicated in broken lines at 20. Additionally, the ordinary reel will have a winding finger having an eye through which the line passes and this finger travels first in one direction and then in the other direction along a shaft 21, so as to distribute the line in layers with each layer comprising a spiral winding with the turns nested next to each other. This has not been shown in the drawings in detail, but it is mentioned in view of the fact that a casting reel constructed according to the invention will normally have such a device on it.

Now, referring to Figure 3 in particular, the housing 11 comprises an inner wall 22 constructed of non-magnetic material, such as brass, and this wall is positioned on the pins 16 by providing shoulders 23 on the pins engaging one side of the wall and nuts 24 threaded on the pins at the opposite side of the wall and which hold the latter against the shoulders. Reduced portions of the pins extend through a cup shaped cover member 26 also made of brass, and the cover member is held in place by screws 27 threaded into the ends of the pins.

The anti-backlash means constructed according to the present invention generally comprises a magnetically controlled governor wherein the principle stated in Lenz's law is employed. This law, briefly stated, is that the electromotive force induced by changing the position of a conductor in a magnetic field is always such that its effect opposes the action which induces it. In the present device as particularly illustrated, an inductor or electrical conductor is located in a magnetic field and the movement of this conductor relative to the field creates the electromotive force employed in the present invention to provide a governor controlling the action on the reel. The action of this governor will be understood better by reference to details of the structure shown.

The magnetic field is provided by placing four permanent magnets indicated at 30, 31, 32 and 33 on the plate 22 and four similar permanent magnets 34, 35, 36 and 37 on a brass disc 38 fastened as will be mentioned presently to the base of the cover 26. The magnets in each group are so arranged that the pole at either end of any magnet is opposed to a like pole of the adjacent magnet, or, in other words, the north pole on each magnet is opposed to the north pole of the magnet next to it, while the south pole of the magnet is opposed to the south pole of the magnet adjacent to it. The two groups of magnets, however, are so arranged circumferentially that the north poles in one group are axially opposite the south poles of the other group. Hence, a strong magnetic field is present at four locations with a strong concentration of magnetic lines of force extending axially between each pair of poles in one group and the opposing unlike poles of the other group.

An inductor movable through the magnetic field is indicated at 40 and comprises a metal disc which is fastened to a hub 41 and the latter in turn has a polygonal opening 42 slidably receiving a polygonal portion 43 of the shaft 10. The disc 40 is preferably constructed from a light metal, such as aluminum or an aluminum alloy and necessarily must be an electrical conductor in order than an electromotive force will be induced therein when the disc is rotated. The hub 41 of the disc is axially positioned by the wall 22 and by a turned-over flange 45 on a bearing element 46 secured by such flange to the cover 26 but is freely rotatable therebetween so that the inductor turns freely. The shaft 10 terminates in a reduced portion 48 which at its ends seats in a bearing 49 which is adjustably positioned by means of a threaded element 50 threaded onto the bearing element 46. It should be observed that regardless of the axial position of the shaft 10, the disc 40 will maintain the same position between the two sets of magnets. A similar bearing is provided for the opposite end of the shaft as is indicated by the numeral 51 in Fig. 1, and by adjusting the two threaded caps, the position of the bearings 49 may be varied so as to center the spool between the housings.

As one means of fastening the magnets to the plate 22 and disc 38, the magnets may have slightly tapered sides indicated at 53 and these are engaged by clamping elements 54 fastened by screws 55 to the plate or disc as the case may be. Any other suitable means may be employed for fastening the magnets in place as will be readily understood.

The disc 38 is turnably fastened to the cover 26 by means of overhanging angle elements 56, shown by Figure 4, which are fastened by screws 57 to the cover 26. These angle elements locate the disc 38 snugly against the cover 26 while still permitting easy turning of the disc. From this, it may be observed that the disc 38, with the magnets thereon, may be turned circumferentially so as to variably position the poles with respect to the poles on the opposite set of magnets. While it is preferable to have the north poles on one set of magnets directly aligned with the south poles on the other set of magnets, it will be appreciated that the strength of the magnetic field may be varied by turning the disc 38 and that, in fact, if the disc is turned through one-quarter of a revolution, the like poles may be placed axially opposite in which event there would be no magnetic field through the inductor or disc and hence there would be no induced electromotive force set up in the disc when the latter is moved. For adjustably holding the disc 38 in an adjusted position, it may be provided with a threaded pin 59 which extends through an arcuate slot 60 in the cover 26 and this pin may have a clamping nut on its outer end.

It might be mentioned generally that the parts forming the magnets and the magnetic fields will be separated from any parts to which they may be fastened by non-magnetic means or metals, or, in other words, the parts forming the magnetic field will be magnetically insulated by using brass or other fastening means to the end that the magnetic field will be as strong as possible. While it has been mentioned that an aluminum or aluminum alloy disc is preferred, this preference is due to the lightness of the metal, but other electrical conductors may be employed in place of aluminum, if desired. The material forming the permanent magnets, that is, the magnets 30 to 37, inclusive, preferably is formed from the highly magnetic metal known in the trade as "Alnico" which is an alloy having an aluminum and nickel base. Other magnetic metals may be used but this particular metal has been found to be highly magnetic with little loss of magnetic power over a long period of time.

Assuming that fishing line is wound on the spool or shaft 10 and a bait is attached to the end of the line, the one making the cast creates considerable kinetic energy through swinging of the pole and when the bait sails through the air the spool unwinds with great rapidity. The rapidity of the unwinding movement of the reel depends, of course, upon the power put into the movement of the pole, weight of the bait and other ordinary factors. The electromotive force set up in the disc inductor creates a slight drag on unwinding movement of the reel but it is found that this slight drag is not objectionable and, in fact, it is definitely less than drags placed on the reel by thumb pressure and braking devices used in accordance with the prior practices. Hence, it has been found that longer casts can be made and even with less effort.

As the bait sails through the air, the electromotive force induced in the disc so controls the speed of the spool that it keeps pace with or stays synchronized to the decelerating flight of the bait and when the latter comes to a stop, no excess line is paid out ahead of the reel. It has been found that if the bait should suddenly stop in its movement by the line getting caught on the spool, the induced electromotive force acts instantly to prevent overrunning of the spool. It has been found that even in cases where the snubbing of the bait has been so violent as to break the line, which condition usually results in an extremely bad tangle, use of the invention has made it, in so far as known, impossible to produce tangling. Under Lenz's law the electromotive force induced is in proportion to the strength of the magnetic field and the speed of rotation and as the magnetic field is constant, any increase in speed creates a proportional increase in the reel governing effect. The control, therefore, is also in direct proportion to the force or power applied. Consequently, there is always automatic governing means compensating for variations in the weights of baits and line, speed of cast, length of rods, and directions of casting, etc. In fact, any drag only absorbs that amount of power that would cause coasting of the spool and the line is paid-out with a minimum of resistance and any tendency of the spool to deliver the line faster than the slackening speed of the bait calls for, results in instant damping action on the reel. In asmuch as only excess revolutions of the spool are damped, there is little or no resistance to the flight of the bait.

It has been found that in practically all kinds of casting with different movements of the rod, and with more or less power in such movements, and with various types and weights of baits, various lines, and various wind conditions, the line will pay out uniformly without requiring any thumb pressure and with even less resistance than that incurred in the use of prior reels where thumb pressure is important. This means that a smoother and longer cast may be made with less difficulty and with less effort. Also, it has been found that the governing means does not add any noticeable or detectable resistance to rewinding of the reel and that it rewinds freely and easily.

Furthermore, it has been found that the danger of overrunning of the reel so as to cause tangling is entirely eliminated and that when the bait reaches its destination, no tangling occurs since the counter electromotive force has progressively prevented any overrunning.

From a manufacturing point of view, the structure may be made and assembled inexpensively and, since the magnets are stationary and the disc does not contact any surface so as to produce friction, resistance to rotation of the reel is not increased by any metal friction. Furthermore, fewer parts are used especially as compared with a reel having brake devices, and the wear and friction characterizing the latter are avoided. Finally, the governing means is almost permanently efficient due to long magnetic life and hence a reel made according to the invention will have a long and highly efficient life. It might be added that where circumferentially arranged poles or magnets are used, the number thereof could be varied.

Although more than one form of the invention has been illustrated and described in detail, it will be apparent to those skilled in the art that various modifications may be made without departing from the scope of the appended claims.

What is claimed is:

1. A fishing reel comprising a housing comprising a pair of substantially parallel end walls, a shaft means rotatable relative to the housing and upon which fishing line may be wound, an inductor disc driven by the shaft and disposed between the walls in substantially parallel relation thereto, and magnet means on the end walls at opposite sides of the disc and creating a magnetic field passing through the disc, the magnet means at each side of the disc comprising a circumferentially arranged series of bar magnets disposed in abutting end to end relation about the axis of the disc, the poles of the bar magnets on one end wall being axially opposite unlike poles of the bar magnets on the other end wall.

2. A fishing reel comprising a housing comprising a pair of substantially parallel end walls, a shaft means rotatable relative to the housing and upon which fishing line may be wound, an inductor disc driven by the shaft and disposed between the walls in substantially parallel relation thereto, and magnet means on the end walls at opposite sides of the disc and creating a magnetic field passing through the disc, the magnet means at each side of the disc comprising a circumferentially arranged series of bar magnets disposed in end to end substantially abutting relation about the axis of the disc with the adjacent ends of each pair of magnets defining like magnetic poles, the poles of the bar magnets on one end wall being axially opposite unlike poles of bar magnets on the other end wall.

JOSEPH C. ROMINE.

REFERENCES CITED

The following references are of record in the file of this patent:

UNITED STATES PATENTS

| Number | Name | Date |
|---|---|---|
| 1,855,876 | Barker | Apr. 26, 1932 |
| 1,862,267 | Honig | June 7, 1932 |
| 2,012,748 | Baughman | Aug. 27, 1935 |
| 2,068,820 | Sarazin et al. | Jan. 26, 1937 |
| 2,071,943 | Fraser | Feb. 23, 1937 |
| 2,190,786 | Henze | Feb. 20, 1940 |
| 2,293,748 | Johnson | Aug. 25, 1942 |
| 2,355,484 | Teker | Aug. 8, 1944 |
| 2,361,239 | Ransom | Oct. 24, 1944 |
| 2,373,262 | Rogowski | Apr. 10, 1945 |

FOREIGN PATENTS

| Number | Country | Date |
|---|---|---|
| 189,905 | Great Britain | Dec. 14, 1922 |